United States Patent
Cancro et al.

(10) Patent No.: US 9,576,310 B2
(45) Date of Patent: Feb. 21, 2017

(54) NORMALIZING UNIVERSAL PRODUCT CODES

(71) Applicant: Wal-Mart Stores, Inc., Bentonville, AR (US)

(72) Inventors: Richard Neil Cancro, Portland, OR (US); Douglas James Pedley, Portland, OR (US); Joel Bennett Acker, Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 325 days.

(21) Appl. No.: 14/092,842

(22) Filed: Nov. 27, 2013

(65) Prior Publication Data
US 2015/0144689 A1  May 28, 2015

(51) Int. Cl.
*G06Q 30/06* (2012.01)
(52) U.S. Cl.
CPC ................. *G06Q 30/0623* (2013.01)
(58) Field of Classification Search
USPC ....................................... 235/375
See application file for complete search history.

(56) References Cited

U.S. PATENT DOCUMENTS

| 9,047,385 B1* | 6/2015 | Malkin | G06F 17/30879 |
| 2010/0250383 A1* | 9/2010 | Frazier | G06F 21/16 |
| | | | 705/26.1 |
| 2014/0081701 A1* | 3/2014 | Lakshminarayanan | G06Q 30/02 |
| | | | 705/7.29 |
| 2014/0379532 A1* | 12/2014 | Agasti | G06Q 30/0641 |
| | | | 705/27.1 |

OTHER PUBLICATIONS

GTIN Info, UPC Symbols, 2009, Bar Code Graphics, Inc., https://web.archive.org/web/20100309083939/http://www.gtin.info/upc.*

* cited by examiner

*Primary Examiner* — Michael G Lee
*Assistant Examiner* — David Tardif
(74) *Attorney, Agent, or Firm* — Howard & Howard Attorneys PLLC

(57) ABSTRACT

The current disclosure extends to normalizing UPCs so the normalized UPCs can be readily compared against each other and used for item lookups in a local cache. Embodiments of the present disclosure include a UPC cache on a user's mobile device, such as a smartphone. In such embodiments, a UPC that is normalized following processes set forth in the present disclosure may act as a cache key for related product information stored in the cache. By conducting item lookups in a local cache, requests for that data can be served faster than if the data were stored on a remote server.

13 Claims, 2 Drawing Sheets

NORMALIZING UNIVERSAL PRODUCT CODES

BACKGROUND

The Universal Product Code ("UPC") system is a numbering and barcode schema with wide usage to mark and track retail and other products in many parts of the world. For example, many retail products have UPC numbers and corresponding barcodes on their packaging to facilitate scanning and tracking product transport, inventory, sales, and the like. Retailers typically maintain databases of products sold and can conduct item lookups by scanning the UPC of any selected product. The digits of a UPC are systematically encoded in the barcode by varying the widths of black bars and spacing therebetween. The barcode is machine-readable, and typical product packaging carries both numerals and barcodes, such that the packaging can be both human- and machine-readable.

Common numbering standards currently in place for product codes include UPC-A, EAN-13, and UPC-E. The UPC-A standard has 12 numerical digits, with each code uniquely assigned to a product (reference to "UPC" throughout the present disclosure may generally refer to any numbering schema, including but not limited to EAN-13). EAN-13 has 13 digits, and UPC-E has 6 digits. A product number may include a prefix numeral code, a manufacturer/company numeral code, which in some examples comprises three to eight digits, and an item reference numeral code, which in some examples comprises two to six digits.

Some numbering schema additionally includes a final check digit for verification/error detection. The check digit is a number appended at the end of the UPC, and can be used to check that the other digits were input correctly. Generally, a check digit may be calculated by following an established algorithm on the other digits in the code. If the calculated check digit does not match the check digit on the barcode then it may be determined that a numeral was incorrectly scanned and a scan re-attempt can be made.

When a UPC is scanned, there may not be obvious signals regarding which format the scanned UPC adheres to. For example, a scanned barcode may have nine digits. The barcode may represent a UPC comprising 8 normal digits and a check digit. Alternatively, the barcode may comprise 9 normal digits and no check digit. Because of the various numbering schema and uncertainly of the numbering schema used, a false negative error may result. For example, when attempting to convert a 9-numeral UPC (a UPC having 9 numerals and no check digit), if the UPC is incorrectly interpreted as an 8-digit UPC having a $9^{th}$ check digit, there is a 10% probability that the supposed check digit will resolve even though it is not, in actuality, a check digit. The result could be an incorrect item association with the scanned UPC.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
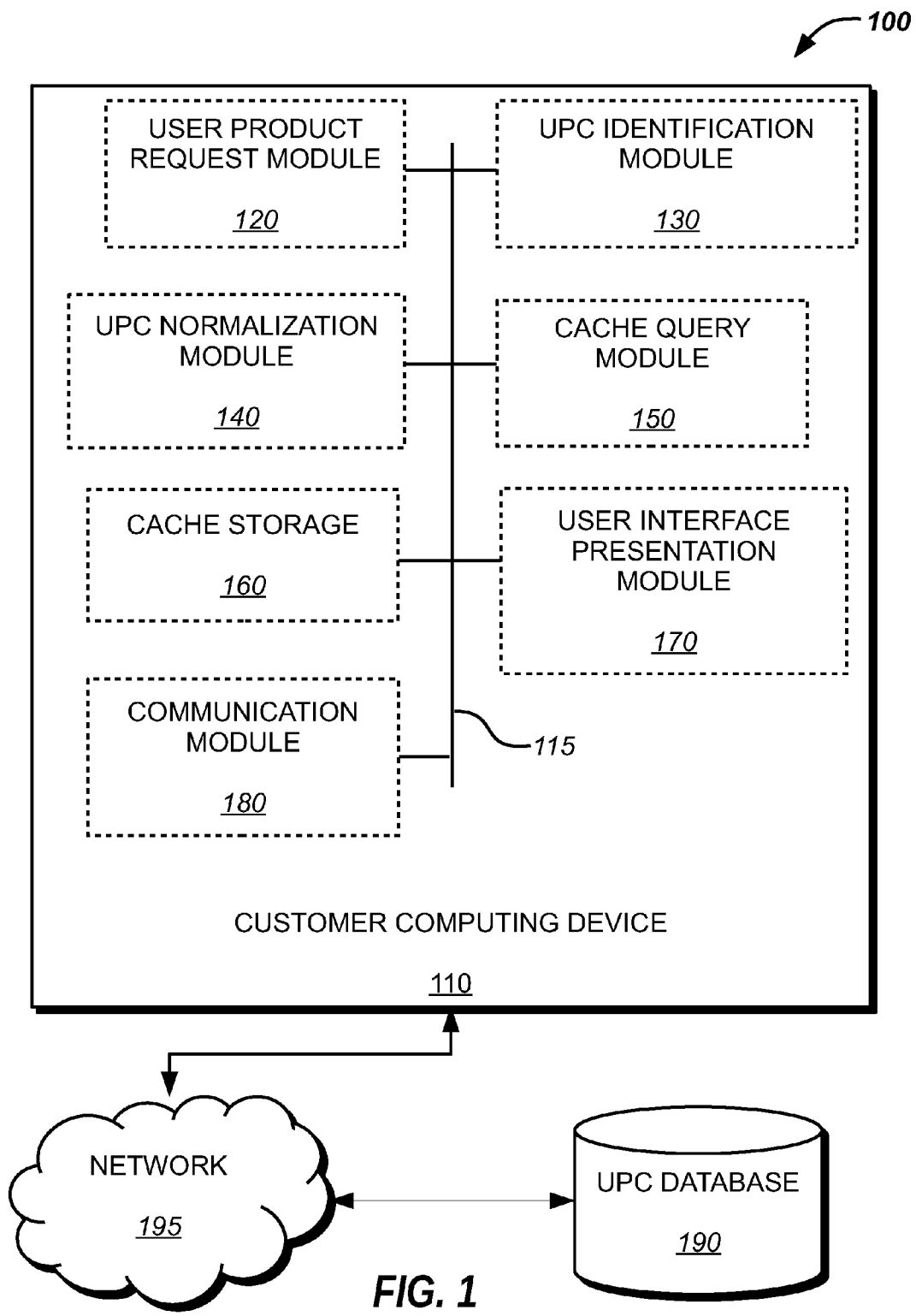
FIG. 1 is a block diagram illustrating components of a UPC normalization system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure extends to methods, systems, and computer programs for normalizing UPCs. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Under some circumstances, a retailer that offers products for sale may find that some products have UPCs that adhere to one coding schema while other products have UPCs that adhere to a different coding schema. It may be desirable for the retailer to use standardized UPCs across all products to increase the efficiency of the UPC system. In particular, if all UPCs adhere to a single, common format, each product's normalized UPC can be used as a cache key for UPC/product lookups. Referring now to FIG. 1, a block diagram illustrating an example of a UPC normalization system 100 of the present disclosure is depicted. UPC normalization system 100 comprises a customer computing device 110 and a UPC database 190. Customer computing device may also be referred to herein as a "user computing device." In embodiments of the present disclosure, customer computing device 110 comprises a mobile device. In the embodiment depicted in FIG. 1, customer computing device 110 comprises a user product request module 120, a UPC identification module 130, a UPC normalization module 140, a cache query module 150, a cache storage 160, a user interface presentation module 170, and a communication module 180. In embodiments, customer computing device 110 comprises a mobile device such as a smartphone. In other embodiments, customer computing device 110 comprises other types of computing devices.

In embodiments, user product request module 120, UPC identification module 130, UPC normalization module 140, cache query module 150, cache storage 160, user interface presentation module 170, and/or communication module 180 are implemented as software instructions and/or data stored in device 110 having computer-readable instructions to carry out operations as described herein. User product request module 120 is adapted to initiate a product request. A product request may be initiated by an application installed on device 110 that queries a normalized UPC for a particular item. One example of a normalized UPC request is a price-check initiated by a customer scanning a UPC of an item with the device 110 (such as a mobile device). As an additional example, a request for a normalized UPC may be made in order to effectuate a transaction via the device 110.

UPC identification module 130 is adapted to receive a barcode, inspect the barcode, and compare the barcode to the various known formats to determine the format of the barcode. In embodiments, a barcode input to UPC identification module 130 may be received from a camera module of a computing device, for example a camera of a smartphone.

UPC normalization module 140 is adapted to receive, from UPC identification module 130, the format of the inputted barcode and transform the barcode into a normalized, standardized format. In embodiments of the present disclosure, a format similar to the EAN-13 format is the standardized format. In other embodiments, other formats can be selected as the format for normalized product codes. In embodiments, the UPC normalization module 140 is adapted to convert the inputted barcode to a normalized UPC by expanding the UPC and trimming the UPC, as will be described in further detail below.

Cache query module 150 is adapted to search cache storage 160 for the product represented by the normalized UPC. In embodiments, the normalized UPC acts as the cache key and the value returned for that key comprises product data. If a normalized UPC is not found in cache storage 160, evidenced by a cache miss, cache query module 150 is adapted to query UPC database 190 and build cache storage 160 by receiving data from UPC database 190 and incorporating the data into cache storage 160.

In embodiments, cache storage 160 comprises a local cache at device 110. Each key in cache storage 160 comprises a normalized UPC. Data stored in cache storage 160 may include a product name, product pricing, product images, additional product details, and the like, wherein such data corresponds to the normalized UPC key. Stored data may be specific to a selected region and/or store, for example product pricing at a retail location having geographic proximity to the customer using device 110.

User interface presentation module 170 is adapted to generate data and computer-readable instructions to present various user interfaces to a user of device 110. Example user interfaces include search query input interfaces, product UPC scan/query interfaces, product or service listings based on the results of a previous search or other action, and the like.

In embodiments of the present disclosure, communication between modules 120, 130, 140, 150, 160, and 170 and UPC database 190, and/or additional components of UPC normalization system 100 may be facilitated by communication module 180 and network 195. Communication module 180 is adapted to transmit signals from device 110 to UPC database 190 via network 195. In embodiments, network 195 comprises various forms including, but not limited to, a wireless network, a cellular network, an intranet, the Internet, or combinations thereof. A data communication bus 115 allows the various systems, modules, and components of device 110 to communicate with one another.

UPC database 190 comprises a data set of product information related to a selected normalized UPC. Such product information may include product pricing, including region and/or store-specific pricing, product details, product images, or other potentially-relevant information pertaining to a product. UPC database 190 can aggregate such data from various local and/or remote data stores. In some embodiments of the present disclosure, outside data is culled and entered in UPC database 190; such outside data may include an image, coupon information, and the like. As with data stored at cache storage 160, UPC database 190 can store data specific to a selected region and/or store.

Figure 2:
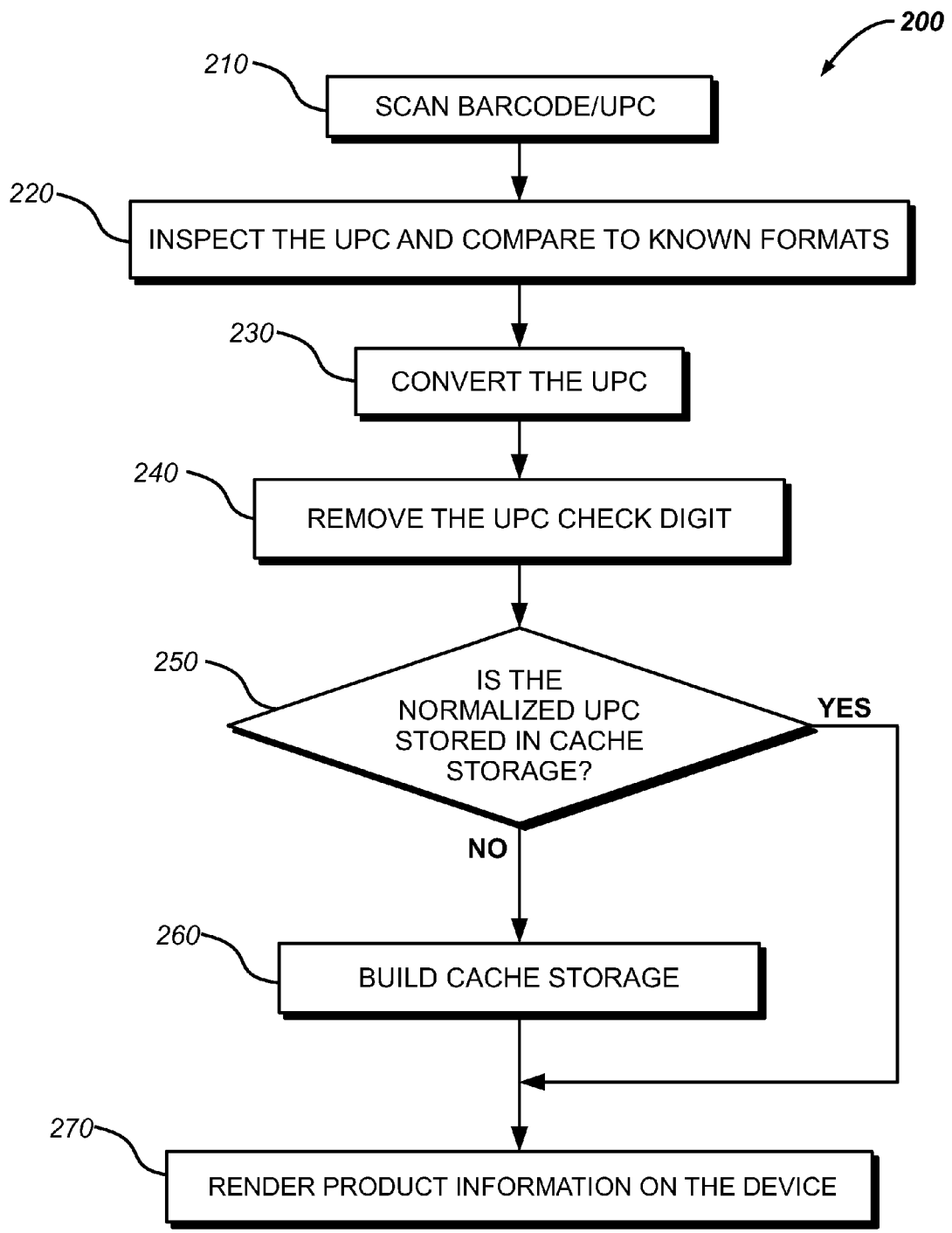
FIG. 2 is a flow chart illustrating an example method for normalizing UPCs in accordance with some embodiments of the present disclosure.

In operation, embodiments of UPC normalization system 100 can carry out a product lookup based on a scanned barcode, keyed UPC, or an otherwise input product number. Referring now to FIG. 2, embodiments of the present disclosure comprise a method 200. At operation 210, a user initiates method 200 by scanning a barcode UPC. In embodiments, a barcode may be scanned via a camera of device 110, for example a smartphone camera. Alternatively, a UPC may be manually typed or spoken into device 110. A barcode input event may be initialized by user product request module 120 in response to a selected action by the user. For example, a user may desire to purchase an item and therefore select an option to scan the item with device 110. As another example, a product may be presented to the user in a push notification (for example, a holiday special), resulting in the user initiating a product lookup. Alternatively, the user may select to conduct a price check, an availability check, or the like on an item found by a keyword search or presented to the user within a product category. The user may wish to view product details for a product offered for sale by the retailer or a competitor store. In such cases, user product request module 120 can direct user interface presentation module 170 to display a barcode scan interface for the user to scan or otherwise input the item UPC into device 110.

At operation 220, UPC identification module 130 receives the scanned UPC and inspects the UPC. The UPC may be received from the camera or the manual input at an input interface. The UPC is compared to various known formats to determine the format of the entered UPC. UPC identification module 130 can compare the total number of digits in the UPC or analyze numbering patterns according to UPC schema formats to determine the format of the scanned UPC. Other methods of determining a UPC format may be carried out to identify the UPC format of the barcode.

At operation 230, UPC normalization module 140 converts the inputted UPC into the selected format for normalized UPCs. In embodiments, converting the UPC comprises expanding the UPC using known computational methods, for example converting a UPC having one particular schema to a UPC of another schema. Padding a UPC may include padding the code with zeros so that the expanded UPC meets formatting rules of the normalized schema.

In an example embodiment, a UPC is converted to a normalized UPC by the following process: First, the UPC is checked to determine if the UPC has 8 digits. If the UPC has eight digits, it is presumed to adhere to the UPC-E numbering schema. Second, the UPC-E number is expanded to UPC-A format using known UPC expansions methods. Third, the UPC is checked to determine if it has a check digit. If not, the check digit is computed and appended to the UPC. Fourth, according to one embodiment, the UPC is then processed by removing all leading zeros, thereby resulting in a normalized UPC.

In embodiments, a UPC having embedded price, quantity, and/or weight information specific to a product is converted by additionally replacing such price, quantity, and/or weight information with zeros so that the converted UPC can match the normalized UPC for that item without regard to price, quantity, and/or weight. In embodiments, a check digit is calculated using the check digit algorithm for the selected schema rules.

In some cases, ambiguity in the scanned UPC may lead to uncertainty regarding what schema the scanned UPC follows. In such cases, embodiments of the present disclosure follow a cascading procedure, where UPC normalization module 140 starts with the most directly-relatable UPC encoding schemes and if those fail to match, UPC normalization module 140 attempts progressively looser translations of the UPC, trying to find a related product.

At operation 240, UPC normalization module 140 trims the expanded UPC by removing the check digit. In alternative embodiments, a check digit is left on the expanded UPC. In embodiments of the present disclosure, the expanded, padded, and trimmed UPC resulting from operation 240 comprises the normalized UPC.

At operation 250, the normalized UPC is presumed to represent a cache key for a corresponding item. In embodiments, the normalized UPC is converted into a string of numerals (such that any leading zeros are preserved) and used by cache query module 150 as a lookup key at cache storage 160. If the cache query results in a cache hit, the returned data associated with the normalized UPC cache key is returned and rendered and/or processed on device 110 at operation 270. If operation 250 results in a cache miss, then operation 260 is carried out.

At operation 260, if the normalized UPC was not found at cache storage 160, cache query module 150 queries UPC database 190 and builds or rebuilds cache storage 160 by receiving data from UPC database 190 and incorporating the data into cache storage 160. In embodiments, cache query module 150 appends the normalized UPC and associated data retrieved from UPC database 190 into cache storage 160. The cache storage key is the normalized UPC. In embodiments where a database contains product information pertinent to the scanned UPC, but the database does not include the normalized UPC, additional processing steps may be carried out to calculate an associated product identification number from the queried UPC or the normalized UPC in order to locate such product information.

At operation 270, the data associated with the normalized UPC cache key is returned and rendered and/or processed on device 110. In embodiments, the product information is rendered on device 110 for the user. In other embodiments, a transaction involving the returned product is initiated.

In some cases, two or more potential products may both match the scanned UPC, depending on which schema is used to interpret the UPC. In such cases, the expansion, padding, and trimming steps may result in two or more different normalized UPCs, upon which the process can be forked and carried out on each potential normalized UPC. A query for each normalized UPC may be transmitted to cache storage 160 and/or UPC database 190. If one query successfully return a product and the other queries fail, it may be ascertained that the successful UPC query represents the correct product and the data associated with the product may be returned. In some cases, two (or more) different queries may successfully return results. In such cases, additional context may be analyzed to deduce what product the user was attempting to look up. For example, if the customer was navigating in the clothing department, and only one of the items queried is clothing, it may be inferred that the clothing item is the expected result. In some cases, such as when a user is attempting to purchase a product by scanning the product barcode, it may be desirable to display an error message instead of deducing the correct product. For example, the error message "We are having trouble reading this. Please enter the product name" may be displayed to the user. Alternatively, the user may be prompted to traverse a product category tree or otherwise browse an interface to select the desired product.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method for normalizing an item UPC comprising:
   receiving, at a user computing device, a product code, wherein the product code follows a code schema;
   at a UPC identification module of the user computing device, identifying the code schema;
   at a UPC normalization module of the user computing device, converting the product code to a normalized UPC by converting the code schema associated with the product code to a normalized UPC code schema;
   querying a cache storage of the user computing device using the entire normalized UPC as a cache lookup key;
   if querying the cache storage results in a cache miss, querying a UPC database using the entire normalized UPC as the cache lookup key;
   at a cache query module of the user computing device, receiving a query result corresponding to the normalized UPC; and
   at a display of the user computing device, rendering product information corresponding to the product code.

2. The method of claim 1, wherein receiving a product code comprises scanning a product bar code with a mobile device camera.

3. The method of claim 1, wherein the user computing device comprises a mobile device.

4. The method of claim 1, wherein the UPC database comprises a remote database.

5. The method of claim 1, wherein converting the product code to a normalized UPC comprises: expanding the product code; and padding the product code.

6. The method of claim 5, further comprising trimming a check digit from the product code.

7. The method of claim 1, further comprising initiating a purchase of a product corresponding to the product information.

8. The method of claim 1, further comprising adding the normalized UPC and the query result corresponding to the normalized UPC to the cache storage.

9. A system for conducting a UPC item query, comprising:
   a mobile device, further comprising:
      a UPC identification module adapted to identifying a code schema of an inputted product code;
      a UPC normalization module adapted to convert the product code to a normalized UPC by converting the code schema associated with the product code to a normalized UPC code schema;
      a cache query module adapted to:
         query a cache storage of the user computing device using the entire normalized UPC as a cache lookup key;
         query a remote UPC database using the entire normalized UPC as the cache lookup key;
         receive a query result corresponding to the normalized UPC; and
         add the normalized UPC and the query result corresponding to the normalized UPC to the cache storage;
      the cache storage comprising the entire normalized UPC as the cache lookup key; and
      a user interface presentation module adapted to generate data and computer-readable instructions to present various user interfaces to a display of the mobile device.

10. The system of claim 9, further comprising a remote UPC database.

11. The system of claim 9, wherein the mobile device comprises a camera adapted to scan a product bar code.

12. The system of claim 9, wherein the UPC normalization module is adapted to: expand the product code; and pad the product code.

13. The system of claim 12, wherein the UPC normalization module is adapted to trim a check digit from the product code.

* * * * *